Aug. 23, 1966 H. PRIEBS 3,268,888

ELECTROMECHANICAL APPARATUS FOR CONVERTING CODED INTO DECODED DIGITAL VALUES

Filed Jan. 28, 1964 4 Sheets-Sheet 3

Aug. 23, 1966 H. PRIEBS 3,268,888

ELECTROMECHANICAL APPARATUS FOR CONVERTING CODED INTO DECODED DIGITAL VALUES

Filed Jan. 28, 1964 4 Sheets-Sheet 4

United States Patent Office 3,268,888 Patented August 23, 1966

3,268,888

ELECTROMECHANICAL APPARATUS FOR CONVERTING CODED INTO DECODED DIGITAL VALUES

Horst Priebs, Bielefeld, Germany, assignor to Anker-Werke Aktiengesellschaft, Bielefeld, Germany, a corporation of Germany Filed Jan. 28, 1964, Ser. No. 341,168
Claims priority, application Germany, Mar. 22, 1963, A 42,692
14 Claims. (Cl. 340—347)

My invention relates to apparatus for converting coded digital values into straight digital values, such as for translating into ordinary decimal numbers the results calculated in an electronic computer and available therefrom in binary-coded decimal (BCD) form, representing each digit of the decimal number by a four-bit binary number.

Known devices for thus decoding a tetra-binary code system perform the conversion with the aid of relaying or switching circuits which control a total of nine electromagnets per decimal position and thereby selectively set a movable mechanical indicator member. The need for nine electromagnets in addition to the four relaying switches for each decimal position renders these devices extremely complicated and spacious. Thus, a calculating machine of the usual fourteen-position capacity, requires 126 electromagnets and 56 switching relays, as well as a connecting cable with at least 140 wires. Aside from the need for large amounts of material, a problem is posed by the difficulty of accommodating the numerous electrical control components and their interwiring, since the space available, for example in conventional adding machines, is too limited and, if provided for by a separate housing such as in the form of a subbase, would become greatly excessive.

Other devices, particularly for indicating purposes, convert the binary-coded system into the straight decimal system by means of several servomotoric, self-balancing electric resistance bridge networks which translate an entered binary value to a decimal indicating scale. In some cases the indicating scale has been substituted by rotatable indicator drums with or without decimal graduation. The inaccuracy of such resistance bridge systems does not permit their use for computing business machines or similarly exacting purposes.

Also known are devices which transmit the values of a binary-code system onto punched cards or other record carriers subsequently used for controlling a decoding device proper. For example, a known punched-card controlled decoder operates by having a punched tape control various motor-driven members which in turn close and open the circuit of an electric motor of constant speed so that the duration of the individual running periods corresponds to the decimal number identified by the punchings, the motor rotation being transferred to a counting mechanism. This requires a separate electric motor for each decimal position of the decoded value so that the entire device involves a larger amount of material and occupies a larger space than suitable for use with relatively small calculating machines or the like business machines.

It is an object of my invention to devise apparatus for converting coded digital values to decoded values, that avoid the disadvantages of the known equipment of this type and are particularly well suitable for use in conjunction with business machines and the relatively small electronic computers that have become available as an accessory to accounting and other business machines.

Another, more specific object of my invention is to devise an electromechanical apparatus capable of accurately converting binary-coded decimal values into straight decimal values, while requiring a much smaller number of comparatively simple and compact components and less space than heretofore needed for such purposes.

Still another object of my invention, akin to those mentioned, is to provide an electromechanical apparatus suitable as an accessory to accounting and other business machines for converting BCD systems as employed in the available electronic computers, to the decimal system usually embodied in accounting and other business machines that are required to afford a reading or printing in conventional monetary units.

According to one of the features of my invention, I provide for each coded digit position an electromagnet, and have the magnets act upon respective control members which jointly define a mechanically traversable measuring path, the individual control members being movable by means of the appertaining electromagnet so as to be eliminated from the measuring path with the result that the active length of the measuring path is proportional to a digit value in the corresponding one decimal position of the decoded value. I further provide for each individual decoded digit position a read-out structure which is displaceable in proportion to the decoded digit value and has feeler means engageable with the assembly of control members for limiting the displacement of the read-out structure in accordance with the abovementioned active length of the measuring path. The displacement of the read-out member is thus made indicative of the decoded value and available to be transmitted to mechanical indicating, printing or counting means of an accounting machine or the like.

The above-mentioned and further objects, advantages and features of my invention, said features being more fully set forth in the claims annexed hereto, will be described presently with reference to a preferred embodiment which is based upon a conversion of binary-coded decimal values into straight decimal values, the binary code used having for each decimal position a total of four bits according to the values 1–2–4–2. That is, each individual numeral from 0 to 9 in the same decimal position is represented by a four-bit code as shown in the following table:

| | 2421 |
|---|---|
| 0= | 0000 |
| 1= | 000L |
| 2= | 00L0 |
| 3= | 00LL |
| 4= | 0L00 |
| 5= | 0L0L |
| 6= | 0LL0 |
| 7= | 0LLL |
| 8= | LLL0 |
| 9= | LLLL |

This tetra-binary code system has the advantage that only four magnets and only three different component measuring distances in the ratio 1:2:4:2 are required for each digit (decade) of the decoded decimal system.

Embodiments of apparatus according to the invention will be described presently with reference to the accompanying drawings in which.

Figure 1:
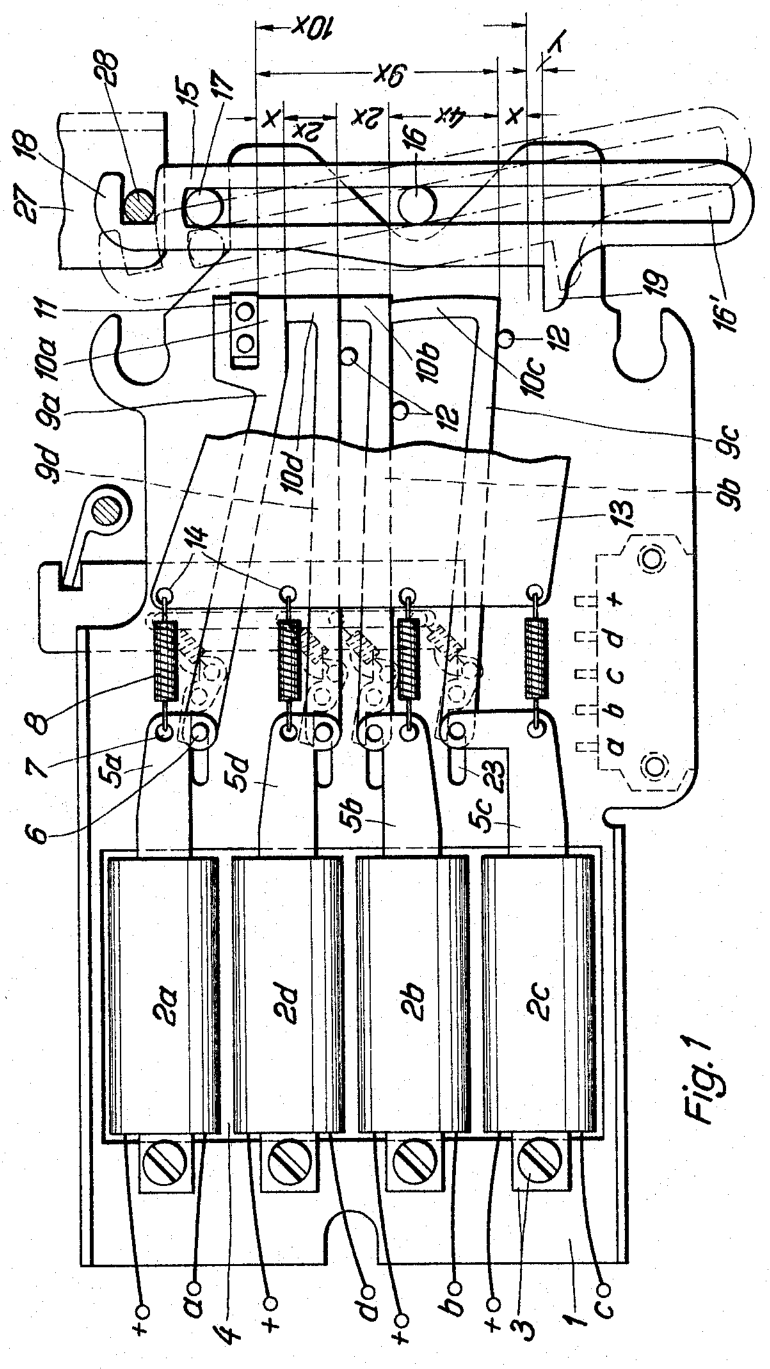
FIG. 1 shows an electromechanical converter unit for one decade of the decimal system, in a side elevation.
Figure 2:
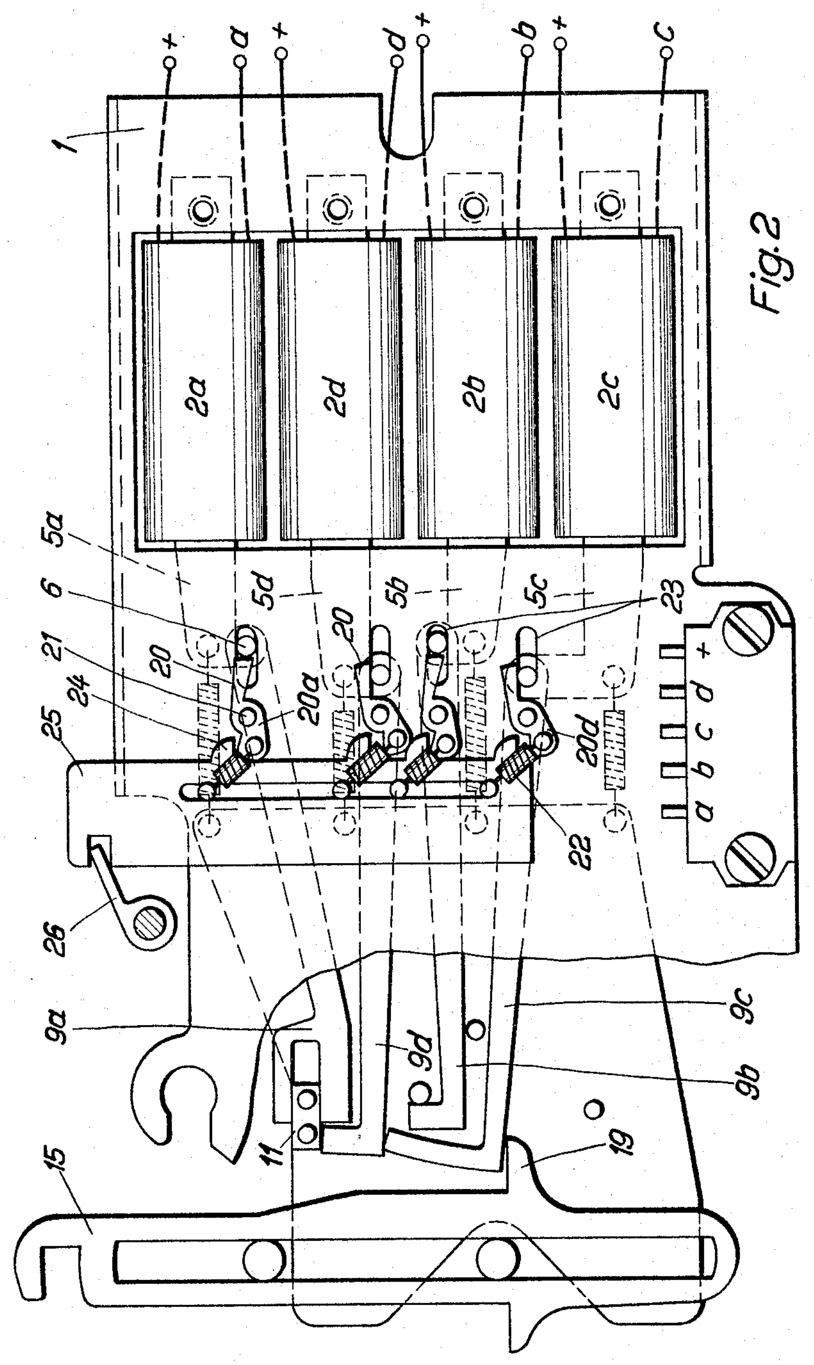
FIG. 2 shows the same unit as FIG. 1 but seen from the rear and showing a read-out slider in the read-out position, in contrast to the inactive position shown in FIG. 1.
Figure 3:
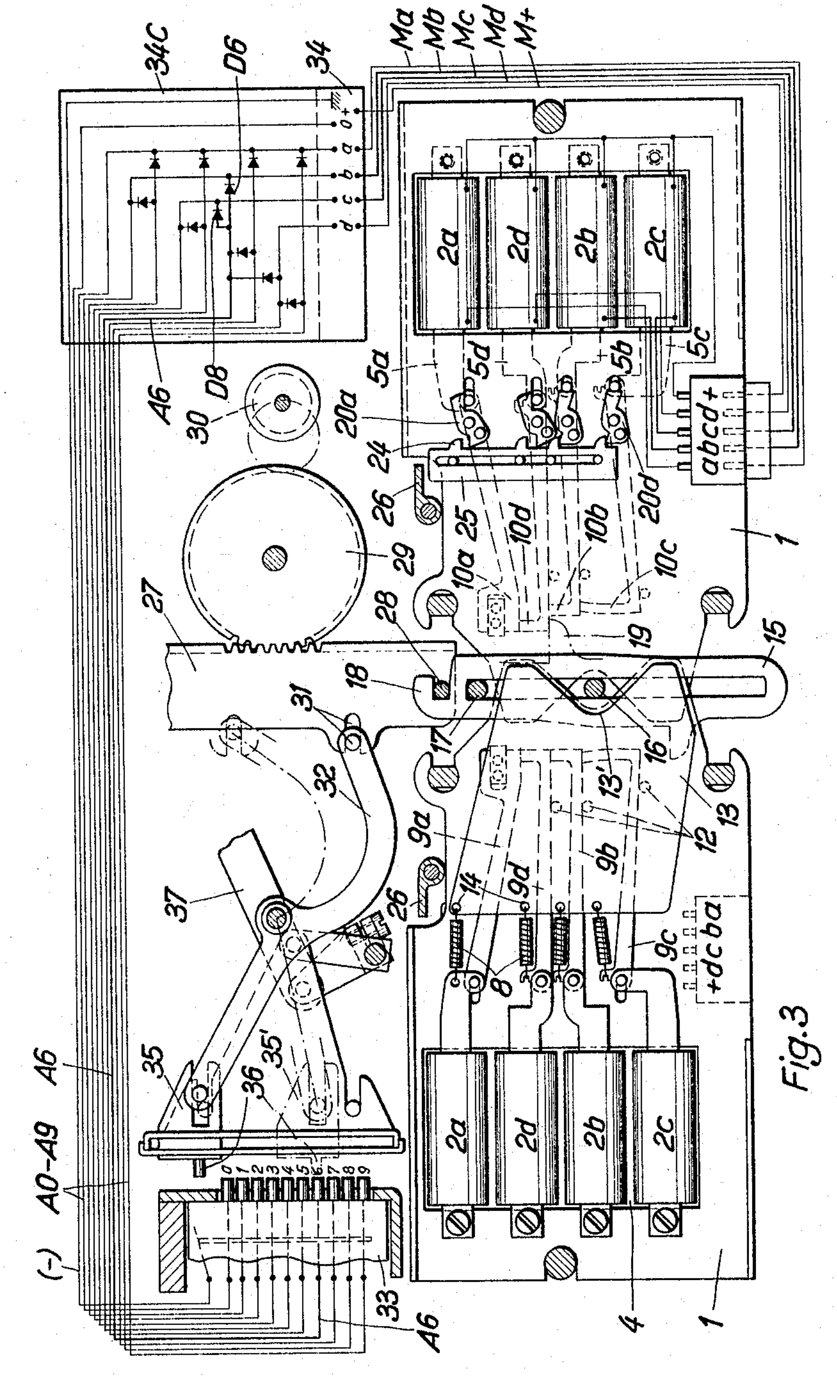

FIG. 3 shows a portion of an accounting-machine mechanism for one decade, in a side elevation, equipped with electromechanical conversion units for two decades in active coupling position of the read-out silder; also the electric circuitry for one decade including a schematically illustrated encoder with an electronic computer, the conversion units being slightly modified in comparison with FIGS. 1 and 2.

Figure 4:
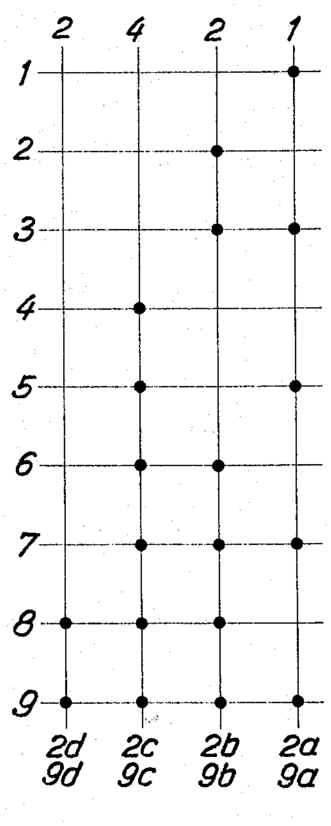

FIG. 4 is an explanatory diagram concerning the relation of the binary-coded system to the straight decimal system employed in the embodiments of FIGS. 1 to 3 and in accordance with the foregoing tabulation.

Some of the reference numerals used on the drawings and in the following specification are supplemented by a suffix *"a," "b," "c,"* or *"d."* These suffixes or index letters are used only with reference to components that participate electrically or mechanically with the conversion example based upon the tetra-binary code system according to FIG. 4. Thus, all components identified by the index *"a"* are coordinated to the first binary position having a measuring value "one"; those indexed *"b"* are correlated to the second binary position of the value "two"; those indexed *"c"* to the third binary position having the value "four," and those indexed *"d"* are assigned to the fourth binary position having the measuring value "two."

FIG. 1 shows a single conversion unit in inactive condition. This unit is assigned to a single decade of the decoded decimal system. Consequently, if a total capacity of fourteen decimal positions is to be provided for, fourteen units according to FIG. 1 are needed, these units being stacked horizontally, one behind the other.

The illustrated unit comprises a mounting plate 1 of sheet metal on which four electromagnets 2*a*, 2*b*, 2*c*, 2*d* are fastened by means of lugs and screws 3. The magnet windings are about halfway located at the front (FIG. 1) of the mounting plate, whereas the other side protrudes through an opening 4 of the plate to the rear side (FIG. 2). The opening 4, if desired, may be formed of four individual openings instead of the single opening shown, and serves to prevent the magnets from turning about their respective fastening screws 3. In the illustrated embodiment the magnets consist essentially of solenoid coils which are provided with respective armatures 5*a* to 5*d* in the form of pull cores to be attracted into the respective coils when the coils are energized. The coils have a common head attached to one terminal (+) of a five-socket connector member which is mounted on the plate 1 (FIG. 3) and has the terminals of its other four sockets *a, b, c, d* connected to the respective other leads of the magnets 2*a* to 2*d*. The connector member is engageable by a five-pin plug for electric connection of the four magnets to a signal transmitter or generator constituted by an electronic computer as will be more fully explained in a later place.

The outer ends of each pull armature 5*a* to 5*d* is provided with a pin 6 and an eye 7. A return spring 8 engages the eye 7 and tends to hold the armature in the illustrated starting position (FIG. 1) when the electromagnet is not energized.

Linked to the pin 6 on each of armature 5*a* to 5*d* is a control member 9*a* to 9*d*. The right-hand end (FIG. 1) of each control member forms a control portion proper at 10*a* to 10*d*. The four control portions 10*a* to 10*d* have each a vertical outer length that defines a given fraction of a measuring or scanning distance; and when all four control portions 10*a* to 10*d* are serially aligned in the rest position shown in FIG. 1, they jointly form a total measuring distance corresponding to nine units of travel proportional to the effective maximum read-out travel distance of a displaceable read-out member (15 or 27) still to be described.

The respective active lengths of the end portions 10*a* to 10*d* on control members 9*a* to 9*d* are dimensioned in accordance with the tetra-binary code 1–2–4–2 sequence. The control member 9*a* is essentially a slider whose end 10*a* is bifurcated and straddles a stop block 11 fastened on the mounting plate 1. The fork leg resting on top of the block 11 serves only for guiding the control member 9*a* in the pulling direction of the armature 5*a* and prevents the control member 9*a* from inadvertently turning away from the proper position. Only the lower leg of the bifurcated portion 10*a* represents by its vertical width the ninth part (value "one") of a total measuring distance of nine value units that can be jointly established by the total assembly of all four control portions 10*a* to 10*d*. This total measuring distance is proportional to the total travel distance of the value-setting read-out structure of an accounting machine or the like, and represents by its partial sections the decimal numerals from 1 to 9 in each decade of the decimal system.

In the condition of rest (FIG. 1), the end portion 10*d* of the control member 9*d* abuts against the end portion 10*a* of control member 9*a*. While, as mentioned, the vertical width of end portion 10*a* represents the decimal digit value "one," the corresponding width of the end portion 10*d* on member 9*d* has twice the vertical width so as to represent two units in the decimal digit value, this being in accordance with the tetra-binary code according to FIG. 4. Consequently, the end portions 10*a* and 10*d*, adjacent to each other, jointly constitute three units of the decimal digit position. The next following end portion 10*b* of control member 9*b* also represents two units, so that the distance jointly formed by the end portions 10*a*+10*d*+10*b*, has the length of five units. The end portion 10*c* of control member 9*c*, following upon the end portion 10*b* of member 9*b*, has twice the vertical width of the end portions 10*b* and 10*d*, thus extending the total measuring distance to nine units of the decimal digit position.

As will more fully appear hereinafter, the control members 9*a* to 9*d*, when being actuated by the respective magnets 2*a* to 2*d*, operate as sliders, but they are simultaneously rotatable about their respective pivot pins 6. The arrangement in the sequence *a, d, b, c* with respect to the magnets 2 and the armatures 5 with control members 9 and their end portions 10 has the advantage that the control members 9*b* to 9*d* need perform a minimum of turning motion during individual conversion operations from the CBD to the decimal system (according to FIG. 4), thus affording a more compact design and smaller space requirements of the apparatus.

The lower edges of the slidable control members 9*d*, 9*b* and 9*c* rest upon fixed guide pins 12 which are fastened to the mounting plate 1. Due to the pins 12 the control members can always return to the proper inactive position according to FIG. 1, and the pins also prevent the control members 9*b* to 9*d* from turning downwardly away from the proper positions.

Shown in FIG. 3 are two conversion units which appertain to respectively different decimal positions of the decoded value. As illustrated, it is preferable to stack up to one-half of the total number of conversion units on one side and the other conversion units on the opposite side in staggered relation to each other for reducing the over-all horizontal width of the convention apparatus. While each conversion unit according to FIG. 3 is substantially designed and operative in accordance with the one so far described with reference to FIG. 1, a minor but preferred modification will be noted with respect to the design of the control members 9*a* to 9*d*. In FIG. 3, the pivoted ends of the three control members 9*b*, 9*c* and 9*d* are shaped as angular or bell-crank levers, and the appertaining return spring 8 engages the lateral short arm of each lever so that the spring also urges each of these control levers against the appertaining one guide pin 12.

A cover sheet 13 (shown partly broken away in FIG. 1 but fully visible in FIG. 3) prevents the control members 9*a* to 9*d* from lateral displacement. The cover sheet 13 is provided with bores 14 into which the return springs 8 for the pull armatures 5*a* to 5*d* are hung.

The mounting plate 1 as well as the cover sheet 13 are each provided with a marginal recess 13' (FIGS. 1, 2, 3) by virtue of which the plate 1 and sheet 13 stay clear of a transverse shaft 16 common to all conversion units of the same stack. The shaft 16 serves as a guide for respective displaceable read-out structures 15 in each unit. The provision of the recess 13' has the advantage that each individual conversion unit can be exchanged without the necessity of removing the appertaining read-out structure 15, or the shaft 16 and a control shaft 17 still to be described.

The above-mentioned read-out structure 15 is mounted in front of the control ends 10*a* to 10*d* of the respective control members 9*a* to 9*d* and is displaceable in the upward and downward direction along the above-mentioned measuring distance whose active length is controlled by the assembly of control members. The read-out structure 15 has the shape of a vertically elongated loop which forms an elongated slot 16' straddling the shaft 16. The slot 16 is also traversed by the control rod 17. As mentioned, the shaft 16 simultaneously constitutes a guide and a pivot for the read-out sliders 15 of an entire stack of conversion units. The control rod 17, also constituting a guide for the read-out slide 15, serves simultaneously for de-coupling the read-out sliders by turning them about the shaft 16. Normally, a hook-shaped end 18 of each slider 15 engages a pin 28 on a vertically displaceable rack. When the control rod 17 moves toward the left (FIG. 1), it shifts the read-out sliders 15 to the dot-and-dash position in which the respective hooks 18 are uncoupled from the pins 28.

At the side facing the control members 9*a* to 9*d*, the read-out slider 15 is provided with a feeler nose 19 which serves for limiting the upward stroke of the slider 15. As the slider is being lifted, the nose 19 abuts against the lower end of the assembly constituted by the end portions 10*a* to 10*d* of the control members 9*a* to 9*d*, unless all of these members are removed from the normal position of rest, in which case the feeler member 19 can move up to the stop block 11. In the condition of rest shown in FIG. 1, the feeler nose 19 is spaced from the lower edge of the lowermost control portion 10*c* a distance larger than the unit value "$x$," so that the total scanning distance which the slider 15 can traverse in the upward direction amounts to more than $10x$. The preliminary idling distance "$y$" of the slider 15 is necessary to prevent any value from being transmitted, not even the value "0," when the business machine performs a special or idle run not requiring a value-registering operation.

For storing the value-denoting settings of the conversion unit, respective latch means 20 for the pull armatures 5*a* to 5*d* are mounted on the rear side of the mounting plate 1 (FIG. 2). Each latch 20 forms a double-armed lever which is pivotally mounted on a pin 21 and rotatable in opposition to the pulling force of a spring 22. One arm of each latch 20 constitutes a latch pawl which abuts against the extended pivot pin 6 of the respective pull armatures 5*a* to 5*d*, the pins 6 protruding through respective slots 23 in plate 1. The respective other arms 20*a* to 20*d* of the latches form coupling faces for engagement by respective dogs 24 of a clearing slider 25 which is vertically displaceable on the mounting plate 1 under control by a clearing flap 26 common to all decades and consequently to all conversion units of a stack.

FIG. 3 shows the arrangement of the conversion devices in an only partly represented accounting machine equipped with a value memory device 33 and a value transmitter 34. As described, the read-out slider 15 of each individual conversion unit is releasably coupled by means of the hook 18 and a pin 28 with a rack 27 appertaining to the same decade. The rack 27 is a value-adjusting machine member of the accounting machine, or may constitute a corresponding member of a calculating or other business machine. Each rack 27 is coupled in the conventional manner through a spur gear 29 with a value-receiving totalizer mechanism 30 that can be coupled or decoupled with respect to the gear 29. Simultaneously, the rectilinear, vertical motion of each rack 27 is transmitted in known manner to a type carrier of a printer (not shown). The rack 27 is also coupled by a pin-and-slot connection 31 with a control lever 32 that forms part of a memory device 33. The memory device 33 is connected by a multiple-wire cable A0–A9 with an encoder 34C and an electronic computer 34 of the type available in the trade for use with business machines (for example, from Anker-Werke A.G. Bielefeld, Germany, assignee of the present invention) and therefore represented only by its pairs of terminals. It suffices to note that such a computer receives binary-code decimal data from an encoder diode matrix 34C, and issues the computed results also in BCD valves. The memory device 33, likewise, forms no part of the present invention proper.

The memory device 33 comprises, for each decade or decimal position, a vertical row of ten horizontally displaceable switch pins, only one of these vertical rows being visible in FIG. 3. Thus for an accounting machine of fourteen-position capacity, the appertaining memory device 33 possesses fourteen vertical rows of such switch pins. As is more fully described in the copending application, one of the switch pins is selectively depressed in each row used at a time, and is then latched in the depressed position until the next entry is made in the memory device. Each depressed switch pin closes a selected circuit for the particular decadic row.

The decade row visible in FIG. 3 cooperates with the control lever 32 for the one decade to which the conversion unit shown at the left of FIG. 3 is related, it being understood that the other vertical rows of switch pins in the memory device 33 cooperates with respective other control levers appertaining to the other conversion units. Thus, dot-and-dash positions shown for parts 32, 35 and 36 in FIG. 3 correspond to a different row of switch pins behind the one visible in FIG. 3, and these parts appertain to the one converter unit shown at the right of FIG. 3. While the converter unit at the left is illustrated in its inactive condition of rest (corresponding to FIG. 1), the conversion unit shown at the right is in active condition, namely in the read-out position "six" of its decade.

The electric circuit connections shown in FIG. 3 for only one decade, are identical for each other decade. For example, in a fourteen-position accounting machine, 140 leads and one current-supply lead (−) extending from the memory device 33 are required for connecting the memory device with the encoder 34C and electronic computer 34, or with a punching device or other equipment to be electrically controlled.

If desired, the encoder 34C for converting the decimal system into the four-bit binary system by means of a diode matrix may also be located in or on the memory device 33. In this case, the electric connection of the memory device with an electronic computer 34 or other apparatus, relating to a fourteen-position decimal number, requires only 57 connecting wires instead of 141.

The performance of the apparatus will be described presently for a simple example with reference to the circuitry according to FIG. 3. Assume that the factors 6 and 26 are to be multiplied by performing the following four stages of operation:

(1) Entering the factors 6 and 26 into the accounting machine.

(2) Transferring the entered factorial values through the memory device 33 to the encoder 34C of the electronic computer 34.

(3) Multiplication in the computer 34; and (4) Entering the computed result $6\times26=156$ into the accounting machine, particularly the totalizer 30 thereof.

Before posting the factorial values into the accounting machine, the machine is set for "input to memory 33" by actuating a corresponding control key or the like (not illustrated). Actuation of this key has the result of shifting the control rod 17 by mechanical or electrical drive means (not shown) counterclockwise so that the coupling hooks 18 are disengaged from the pins 28 of the racks 27. The read-out sliders 15 now assume the dot-and-dash position according to FIG. 1 so that each rack 27 can freely move upwardly and downwardly without entraining any slider 15.

Now the first factor "6" is posted into the machine, and a machine run then displaces the rack 27 for the first decade in known manner a distance corresponding to six value units. This displacement is transmitted through the pin-and-slot connection 31 to the control lever 32 so that, at the termination of the rack travel, the control lever 32 and the pusher pin 36 assume the position illustrated by dot-and-dash lines in FIG. 3. In this position, the pusher member 35 has shifted to the position 35' and the pusher pin 36 is located in front of the switch pin "6" in the first decade row of the memory device 33. With the aid of a cam (not illustrated) the pusher 35 is now moved by a linking rod 37 toward the left, so that the pusher pin 36 depresses the switch pin "6" of the memory device 33. When thereafter a current pulse occurs in the electric system, the current flows through lead A6 to the encoder 34C where it is split by diodes D6 and D8 into two current pulses and then issued as the second and third binary position into the conventional factor-value memory of the electronic computer 34.

After the second factor "26" is posted into the machine, this factor is encoded analogously in the first and second decades. The computer 34 is then released for operation and the computed result, namely the value "156," remains stored in form of binary-coded decimals in the computer memory, until a call-out signal is received.

The call-out signal for the computed result is issued by setting the accounting machine, such as by depression of a corresponding control key (not shown), to "transfer from computer." This causes the control rod 17 to shift clockwise and to thereby couple all read-out sliders 15 with the respective racks 27.

The transmission and entering of the coded result "156" from the computer 34 into the accounting machine takes place through wires assigned to each decade, namely those denoted by M*a* to M*d*, M+ (FIG. 3), which connect the electromagnets **2*a* to 2*d* of the individual converter units for the respective decade with the electronic computer 34**. For thus transmitting the result "156," the converter units for the first, second and third decades (units, tens and hundreds) are controlled from the computer in the following manner.

In the converter unit for the first (unit) decade, the magnets **2*b* and 2*c*** are energized through leads M+, M*b* and M*c*, in accordance with the diagram of FIG. 4. Thus, the control members **9*b* and 9*c* are displayed away from the position of rest, this being shown for example in the unit shown at the right in FIG. 3. The active end portions 10*b* and 10*c* of the control members now define a measuring distance of "two"+"four" measuring units and hence an active length corresponding to a total of "six" measuring units. In the second (tens) decade, the magnets 2*a* and 2*c* become active so that the control portions 10*a* and 10*c* of respective members 9*a* and 9*c* form jointly a meausring path of "five" units composed of "one"+"four" units. In the third (hundreds) decade, the magnet 2*a*** is energized through leads M+ and M*a* so that the active length of the measuring path corresponds to the value unit "one" formed by the control portion **10*a* of control member 9*a*. As described above, the latch members 20 now hold the displaced control members 9*a* to 9*b* in the individual decadic converter units in the displaced positions reached by the actuation of the corresponding magnets 2*a* to 2*d***.

After the magnets **2*a* to 2*d* of the proper converter units have been actuated under control by the computer 34, a run of the accounting machine is released and causes displacement of all racks 27** for the individual decimal positions.

Since now all racks 27 are coupled with the respective read-out sliders 15, the translatory displacing travel of the racks 27 is imparted to the sliders 15. As soon as the nose 19 of a slider 15 abuts against the lower edge of one of the control-member portions **10*a*, 10*b*, 10*c*, 10*d* or against the stop 11, the control members 9*a* to 9*d* are turned about their pivot 6 (FIG. 2) until further rotary motion is blocked by the stop 11**.

The attainable displacement travel of the racks 27 depends upon the length of the path along which the read-out slider 15 in the individual conversion units can travel. The maximum travel distance for each read-out slider is equal to ten travel units ($x$) plus the preceding idling travel ($y$), i.e. the maximum is equal to $10x+y$ according to FIG. 1. For any decade in which all of the four control members **9*a* to 9*d* have remained in the original position (FIG. 1), the possible travel distance of the read-out slider 15 is equal to $x+y$. When the slider 15 has reached the end of the last-mentioned minimum travel, the appertaining rack 27 with the printing or totalizing mechanism of the accounting machine is set to "zero." According to the numerical example here being described, the read-out slider 15 for the first (unit) decade can travel beyond the "zero" position an additional distance corresponding to six value units "$x$," because the control members 9*b* and 9*c* with their end portions 10*b* and 10*c*, representing "two" and "four" value units, have been displaced away from the action range of the nose 19 on the read-out slider. In the second (tens) decade, the slider 15 can travel "five" value units beyond the "zero" position. In the third (hundreds) decade, the slider 15 can travel "one" value unit beyond the "zero" position. Consequently, when the machine run is completed, the positions of the racks 27** for the first, second and third decades have set the appertaining printing and totalizing mechanisms to the value "156," and this value is thus registered in the accounting machine.

Simultaneously with the registering or printing run just described, the value "156" being registered can be automatically posted into the memory device 33 by the above-described means, if this is desired. The memorized value can then be again issued as a new factorial value to the computer 34 so that, when thereafter a further factorial value is posted into the accounting machine, a continued multiplication can be carried out.

With the same means, any other available type of computation can be carried out analogously with the aid of an accounting machine or the like.

At the termination of each computing and registering operation, the clearing flaps 26 are actuated automatically or by hand. The dogs 24 of the clearing sliders 25 then press upon the arms **20*a* to 20*d* of the latch pawls 20, thus turning them counterclockwise (FIG. 2) and releasing the previously arrested control members 9*a* to 9*d* which then follow the pull of springs 8** and return to the starting position according to FIG. 1 or FIG. 3 (left conversion unit).

To those skilled in the art it will be obvious from a study of this disclosure that my invention permits of various modifications as to design details, arrangement and circuit connections and hence can be given embodiments other than particularly illustrated and described herein, without departing from the essential features of the invention and within the scope of the claims annexed hereto.

I claim:

1. Electromechanical apparatus for converting coded digital values to decoded values, comprising for each individual digit position of the decoded value an assembly of as many control members as the coded value has code bits jointly indicative of the decoded digit value, said control members having respective control portions which, when all of said members are in a given position, are serially adjacent to each other and jointly define a given maximal active length of said assembly, said control members being individually displaceable from said position so that the active assembly length defined by said control portions is dependent upon which of said members are in said given position at a time; individually actuable electromagnet means connected to said respective control members for positionally controlling them selectively; and a read-out structure for each individual decoded digit position, said structure being displaceable in proportion to the decoded digit value and engageable with said control member assembly for limiting the displacement of said read-out structure in dependence upon said active length.

2. Electromechanical apparatus for converting binary-coded decimal values to decoded decimal values, comprising for each individual decimal position of the decoded value an assembly of four control members having respective control portions which, when all of said members are in a given position, are serially adjacent to each other and jointly define for said assembly a given maximal length, the respective individual lengths of said control portions being in accordance with the unit values of respective four binary-code bits, said control members being individually displaceable from said position so that the active assembly length defined by said control portions at a time is dependent upon which of said members are in said given position; four individually actuable electromagnet means connected to said respective control members for positionally controlling them selectively; and a read-out structure for each of said decoded decimal positions, said structure being displaceable in proportion to the decoded decimal digit value and having a feeler stop engageable with said control member assembly for limiting the displacement of said read-out structure in dependence upon said active length.

3. In converting apparatus according to claim 2, said maximal length of said assembly corresponding to nine unit values of said decoded decimal digit position, and said read-out structure being normally in a position where said feeler stop is spaced from said assembly an idling distance corresponding at least to one value unit of the decoded decimal position, so that said structure when commencing a displacement must always travel through said idling distance before reaching said active length of said assembly.

4. In converting apparatus according to claim 3, said respective individual length of said four control portions having a ratio of 1:2:4:2 in accordance with a tetra-binary code.

5. Electromechanical apparatus for converting binary-coded decimal values to decoded decimal values, comprising for each individual digit position of the decoded decimal value an assembly of four control members having respective control portions which, when all of said members are in a given position, are serially adjacent to each other and jointly define for said assembly a maximal length representing nine units of the decoded decimal position, the respective individual lengths of said control portions having a length ratio of 1:2:4:2 in accordance with a tetra-binary code, said control members being individually displaceable from said position so that the active assembly length defined by said control portions at a time is dependent upon which of said members are in said given position; four individually actuable electromagnet means connected to said respective control members for positionally controlling them selectively; and a read-out structure for each individual decoded decimal position, said structure being displaceable in proportion to the decoded decimal digit value and having stop means engageable with said control member assembly for limiting the displacement of said read-out structure in dependence upon said active length, said respective electromagnet means and control members being arranged in a sequence at which said individual lengths of said control portions form the arithmetic series 1–2–2–4.

6. Converting apparatus according to claim 5, wherein the control portion of the fourth binary-code bit having four-unit length is disposed between the respective control portions of the first and second bits having each a two-unit length.

7. Electromechanical apparatus for converting coded digital values to decoded values, comprising a mounting plate and an assembly of control members for each individual digit position of the decoded value, said assembly having as many control members as the coded value has code bits, said control members being movably mounted on said plate and having respective control portions which, when all of said members are in a given position, are serially adjacent to each other and jointly define a given maximal active length of said assembly, said control members being individually displaceable from said position so that the active assembly length defined by said control portions at a time is dependent upon which of said members are in said given position; individually actuable electromagnet means connected to said respective control members for positionally controlling them selectively, said magnet means being mounted beside each other on said plate, and said plate having a recess partly occupied by each of said magnet means; and a read-out structure for each individual decoded digit position, said structure being displaceable in proportion to the decoded digit value and having stop means engageable with said control member assembly for limiting the displacement of said read-out structure in dependence upon said active length.

8. In a converting apparatus according to claim 7, each of said magnet means having a pull armature articulately linked with one of said control members for pulling it away from said given position, and spring means biasing said armature and control member toward said position.

9. In converting apparatus according to claim 2, said assemblies for respectively different decimal positions being mounted in mutually staggered relation opposite each other with said control portions of respective assemblies facing each other.

10. In converting apparatus according to claim 1, said read-out structures having coupling means for releasable engagement with respective business-machine parts displaceable for value registration whereby said read-out structures are driven from said parts when coupled therewith, and control means for selectively coupling and uncoupling said read-out structures relative to said respective parts.

11. Converting apparatus according to claim 10, comprising a shaft extending transverse to said assemblies and guidingly engaging said displaceable read-out structures, said shaft forming a pivot about which said read-out structures are rotatable for coupling and uncoupling them relative to said parts, and a movable control rod engageable with said read-out structures for jointly rotating them between coupled and uncoupled positions.

12. Converting apparatus according to claim 1, comprising latch means engageable with said respective control members for arresting them in displaced positions, whereby said active length of said assembly, once selectively defined by actuation of said magnets, is preserved until said latch means are released.

13. Converting apparatus according to claim 12, comprising a clearing member extending across said assemblies for a plurality of said digit positions, and release means engageable with said latch means of each of said control-member assemblies and coupled with said clearing member for causing said latch means to release said arrested control members by actuation of said clearing member.

14. Converting apparatus according to claim 7, comprising electric plug-in connector means for electric pulse supply leads, said connector means being mounted on said plate and having five connector contacts of which one is common to said four electromagnet means and four are connected to said four electromagnet means respectively.

No references cited.

MAYNARD R. WILBUR, *Primary Examiner.*

W. J. ATKINS, *Assistant Examiner.*